United States Patent [19]

Price et al.

[11] 4,225,426

[45] * Sep. 30, 1980

[54] MAGNETIC BENEFICIATION OF CLAYS UTILIZING MAGNETIC PARTICULATES

[75] Inventors: William M. Price, St. Austell, England; Alan J. Nott, Huelgoat, France

[73] Assignee: Anglo-American Clays Corporation, Sandersville, Ga.

[*] Notice: The portion of the term of this patent subsequent to May 2, 1995, has been disclaimed.

[21] Appl. No.: 874,427

[22] Filed: Feb. 2, 1978

Related U.S. Application Data

[63] Continuation-in-part of Ser. No. 618,347, Oct. 1, 1975, Pat. No. 4,087,004, and a continuation-in-part of Ser. No. 753,201, Dec. 22, 1976, Pat. No. 4,125,640, and a continuation-in-part of Ser. No. 856,267, Dec. 1, 1977.

[51] Int. Cl.² .......................................... B03B 1/04
[52] U.S. Cl. .......................................... 209/5; 209/8; 209/39; 209/214
[58] Field of Search ........................... 209/5, 9, 214, 8

[56] References Cited

U.S. PATENT DOCUMENTS

| Re. 14,583 | 1/1919 | Schwerin | 209/5 |
| 933,717 | 9/1907 | Lockwood | 209/9 |
| 1,043,850 | 11/1912 | Lockwood | 209/47 X |
| 1,063,893 | 6/1913 | Schwerin | 209/5 X |
| 1,823,852 | 9/1931 | Brandus | 209/9 X |
| 3,451,545 | 6/1969 | Studer | 209/8 |
| 3,826,365 | 7/1974 | Mercade | 209/5 |
| 3,843,540 | 10/1974 | Reimers | 252/62.56 X |
| 3,926,789 | 12/1975 | Shubert | 209/8 |
| 3,928,709 | 12/1975 | Audran | 252/62.56 |
| 3,929,627 | 12/1975 | Frangiskos | 209/9 |
| 4,087,004 | 5/1978 | Nott | 209/214 X |
| 4,125,460 | 11/1978 | Nott | 209/214 X |

FOREIGN PATENT DOCUMENTS 535105 11/1976 U.S.S.R. ............................... 209/39

OTHER PUBLICATIONS

Phys. Rev. Elmore, 309, 310, 1938.
Journal of Applied Physics, Suppl. vol. 32, No. 3, Mar '61, 2355, 2365.

*Primary Examiner*—Robert Halper
*Attorney, Agent, or Firm*—Weingram & Klauber

[57] ABSTRACT

A method for magnetically separating titaniferous discolorants from a crude kaolin clay. A dispersed aqueous slurry of the clay is formed and ferrimagnetic particles are thereupon spontaneously coflocculated with the titaniferous discolorants by seeding the slurry with a system of said particles. The system includes predominantly sub-micron size particles, and the particles further, have an isoelectric point in relation to that of the titaniferous discolorants to enable the spontaneous coflocculation. The slurry is thereupon passed through a porous ferromagnetic matrix in the presence of a magnetic field, to separate the coflocculated particles and discolorants at the matrix.

15 Claims, 3 Drawing Figures

SAMPLE NO. 6-1-C

MAGNIFICATION 192000X

SAMPLE NO. 6-1-J

MAGNIFICATION 154000X

MAGNETIC BENEFICIATION OF CLAYS UTILIZING MAGNETIC PARTICULATES

BACKGROUND OF INVENTION

This application is a continuation-in-part of our co-pending applications, Ser. No. 618,347, filed Oct. 1, 1975, now U.S. Pat. No. 4,087,004 and Ser. No. 753,201 filed Dec. 22, 1976 now U.S. Pat. No. 4,125,640, each being entitled "MAGNETIC BENEFICIATION OF CLAYS UTILIZING MAGNETIC PARTICULATES", and of our copending application Ser. No. 856,267, filed Dec. 1, 1977, and entitled "METHOD FOR SEPARATING METALLIC MINERALS UTILIZING MAGNETIC SEEDING".

This invention relates generally to methods for beneficiation of minerals, and more specifically relates to a method of improving the brightness of minerals such as kaolin clays, through the use of magnetic separation.

Naturally occuring crude clays, including kaolins, frequently include discoloring contaminants in the form of iron and/or iron-stained titanium-based impurities. The titanium-based discolorants are particularly troublesome in the case of the sedimentary kaolins of Georgia, where such impurities are commonly present as iron-stained anatase and rutile.

In the case of the aforementioned kaolin clays it is often desired, and sometimes imperative, to refine the natural product as to bring the brightness characteristics thereof to a level acceptable for paper coating and other applications. Various techniques have therefore been used in the past to effect the removal of the aforementioned discoloring impurities. Thus, for example, hydrosulfites have been widely used for converting at least part of the iron-based (or "ferruginous") impurities to soluble form, which may then be removed from the clays.

Among the most effective methods for removing titaniferous impurities, including e.g. iron-stained anatase, are the well-known froth flotation techniques. According to such methods an aqueous suspension or slurry of the clay is formed, the pH of the slurry is raised to an alkaline value, for example, by the addition of ammonium hydroxide, and a collecting agent is added, as for example, oleic acid. The slurry is then conditioned by agitating same for a relatively sustained period. A frothing agent, such as pine oil is then added to the conditioned slurry, after which air is passed through the slurry in a froth flotation cell to effect separation of the impurities.

Within recent years it has further been demonstrated, that high intensity magnetic separation techniques may be utilized for removing certain of the aforementioned impurities, including titaniferous impurities, and certain ferruginous matter. Anatase, for example, and certain other paramagnetic minerals, have been found to respond to high intensity, high gradient magnetic fields. Thus, for example, U.S. Pat. No. 3,471,011 to Joseph Iannicelli et al, discloses that clay slurries may be beneficiated by retention for a period of from about 30 seconds to 8 minutes in a magnetic field of 8,500 Gauss or higher. Reference may also be made to U.S. Pat. No. 3,676,337 to Henry H. Kolm, disclosing a process for treating mineral slurries by passing same through a steel wool matrix in the presence of a background field of at least 12,000 Gauss. Various apparatus, such as that disclosed in Marston, U.S. Pat. No. 3,627,678 may be utilized in carrying out the Kolm processes. In this latter instance the slurry is thus passed through a canister, which contains a stainless steel or similar filamentary ferromagnetic matrix, while a high intensity magnetic field is impressed on the matrix by enveloping coils.

While the use of magnetic separation, as outlined in the foregoing paragraph, has found a high degree of acceptance in mineral beneficiation technology bearing upon brightening of kaolins, it has generally been believed up until the present time, that such technology was either incapable of producing brightness improvements attainable by the use of the aforementioned flotation techniques, or (by virtue of the requirement for high intensity fields) was not economically practical where major brightness increases were desired. In the foregoing regard it should be especially noted that field intensity levels of the low to intermediate range have not in the past been deemed of substantial value for use in brightening kaolins to commercially acceptable levels.

In almost all of the foregoing prior art, the kaolin slurry to be beneficiated has been presented to the magnetic separator—i.e. in the case of the Kolm and Marston-type teachings, to a porous ferromagnetic matrix—without prior treatment intended to modify the magnetic response of the impurities sought to be removed. One exception to this statement is Abercrombie et. al. U.S. Pat. No. 3,853,983, wherein the magnetic properties of certain kaolins contaminated by iron pyrites, are modified by a prior roasting operation—which transforms the iron pyrites into much more magnetic iron oxides. This roasting treatment, has no effect on titania—which is the principal discolorant sought to be eliminated by the present invention.

Further in Mercade, U.S. Pat. No. 3,826,365, the efficacy of magnetic separation is improved by selectively floculating minute impurities, to thereby produce larger agglomerate of the impurities—which are more easily captured during the separation step.

It may be noted further in the foregoing connection, that over the course of many years, numerous investigators have proposed, and in some instances utilized, processes wherein a constituent of low magnetic attractability present in a mineral mixture, is in some manner modified to increase the magnetic attractability thereof. Several prior proposals have thus considered the concept of adhering magnetic particles such as powdered magnetite or ferrosilicon to the mineral component sought to be separated from a slurry. In virtually all instances wherein such techniques have been proposed, the introduced materials have been of relatively coarse size—typically, for example, the magnetite thus introduced includes particles of at least 50 microns or larger. These prior approaches have further, contemplated use of an intermediate chemical agent to effect adhesion. In some instances, for example, organic or inorganic oils are used to effectively wet or coat one or the other of the elements to be adhered. See in this connection, for example, Hubler, U.S. Pat. No. 2,353,324.

A further disclosure of interest is Shubert, U.S. Pat. No. 3,926,789, which teaches the use of a film of magnetic fluid to selectively wet the mineral particles sought to be magnetically removed. In this instance the magnetic fluids or "ferrofluids", are ultra-stable colloidal suspensions, and most commonly employ an organic carrier phase—such as kerosene. These magnetic fluids are capable of reacting with an external magnetic field and display the behavior of a homogeneous Newtonian liquid.

The teachings of Shubert, while useful in many instances, can introduce undesired chemical species into the slurry, especially the organic carriers, which thereafter must be eliminated from the processing plant effluent. The use of such techniques, as is also set forth in Shubert (by virtue of the ferrofluids used) frequently requires emulsification steps.

It is of interest to further note that the teachings of Shubert contemplate selection of a carrier phase for the ferrofluid as will selectively wet the surfaces of the mineral particles sought to be removed.

Thus Shubert prescribes use of a polar carrier fluid to selectively wet and thereby render magnetic a hydrophilac mineral—and conversely that a non-polar carrier fluid be used where a hydrophobic mineral is to be wet, and thereby rendered magnetic.

The above cited prior art approaches are actually strikingly similar to flotation techniques. In the latter a flotation agent is used which selectively coats the minerals to be removed. Whereas in flotation air bubbles are attached to the coated contaminant which is then removed as a froth, in the above art magnetite takes the place of the air bubbles and is attached by a similar mechanism, with the magnetite/contaminant being removed magnetically rather than gravimetrically.

In accordance with the foregoing, it may be regarded as an object of the present invention, to provide a method for magnetic separation of discoloring contaminants from mineral slurries, such as kaolin slurries, which method enables brightness improvements previously unattainable through magnetic separation processes.

It is a further object of the present invention, to provide a method for magnetically beneficiating mineral slurries such as kaolins, which method yields brightness improvements at sufficiently high levels to obviate any requirement for flotation treatments.

It is a yet further object of the present invention, to provide a method for magnetic separation of discoloring contaminants from mineral slurries, which is based upon the use of particulate magnetic activating agents, of a type which are producible at low costs, and which have little or no detrimental impact upon the environment.

It is still further object of the invention, to provide a method for magnetic separation of discoloring contaminants from kaolin slurries or the like, which enables the use of lower field intensities than have heretofore been deemed appropriate or feasible for such purposes.

It is a yet further object of the invention, to provide a method for magnetic separation of discoloring contaminants from kaolin slurries or the like, which may be utilized with existing magnetic separation apparatus, and which vastly increases the performance capabilities of such devices.

SUMMARY OF INVENTION

Now in accordance with the present invention, the foregoing objects, and others as will become apparent in the course of the ensuing specification, are achieved in a method especially applicable to the separation of titaniferous impurities, i.e. to titaniferous discolorants such as titania from a crude kaolin clay. Pursuant to the method of invention a dispersed aqueous slurry of the clay is initially formed. Thereafter spontaneous coflocculation of the titaniferous impurities with ferrimagnetic particles is effected by seeding the slurry with a system of said particles. The particles of the system are predominantly sub-micron in size, and have an isoelectric point in relation to that of the titaniferous discolorants to enable the spontaneous coflocculation to occur. The treated slurry is thereupon passed through a porous ferromagnetic matrix in the presence of a magnetic field to separate the coflocculated particles and discolorants at the matrix.

The seeding particles are preferably transiently suspended in an aqueous phase prior to intermixing with the slurry. Where in the course of this specification, we use the phrases "transiently suspended" or "unstably suspended", we mean that the system including such particles is not stabilized, e.g. by peptization or the like, so that the particles (in the absence of agitation) will in due course settle from the system.

In a further, but less preferred aspect of the invention, the seeding system may comprise a stable aqueous suspension of predominantly colloidal size ferrimagnetic particles.

For efficient separation the seeding particles should preferably display an isoelectric point within 2.0 units of that of the mineral, i.e. the titaniferous impurities, sought to be removed. Preferably further the pH in the treated slurry is between the isoelectric point of the system particles and that the mineral discolorant, as this increases the coulombic attraction between the two.

A preferable ferrimagnetic seeding system for the use with the processes of the invention may comprise a particulate of ferroso-ferric oxide particles wherein at least 50% by weight of the particles are of sub-micron (i.e. colloidal) size, which particulate is prepared as the product of aqueous coprecipitation of an iron (III) with iron (II) salt by an excess of a relatively strong base. Preparation of a particulate of this type has been described as one aspect of a communication of W. C. Elmore, entitled "Ferromagnetic Colloid for Studying Magnetic Structures" in *Physical Review* 54, 309 (1938).

More generally a particulate comprising a magnetic ferrite of the general formula $MO \cdot Fe_2O_3$, where M is a divalent metal ion, may be used, where the said particulate is again preferably added to the slurry as one which is the product of aqueous coprecipitation of an iron (III) salt with the salt of the divalent metal in the presence of an excess of strong base. Reference may be had in this connection to the paper by W. J. Schuele et. al., entitled "Preparation, Growth and Study of Ultrafine Ferrite Particles", *"Journal of Applied Physics"*, Supplement to Vol. 32, No. 3 (March, 1961), which describes a general method for preparation of these materials.

Although not as effective in the present invention, dry powdered ferrimagnetic materials of the size range heretofore discussed may also be utilized. In these instances the seeding particulate is added to the slurry as a dry powder.

Following seeding of the slurry with the ferrimagnetic particulate system, various apparatus may be utilized to effect the magnetic separation, including the apparatus disclosed in Marston U.S. Pat. No. 3,627,678. In this instance the slurry is passed through a canister which contains a porous ferromagnetic matrix—e.g. of a stainless steel wool or similar filamentary material, while a magnetic field is impressed on the matrix, by enveloping coils.

Contrary to the teachings of the aforementioned Ianicelli and Kolm patents, and in accordance with aspects of the invention cited in our aforementioned copending applications, the performance levels of the magnetic separating apparatus are so vastly augmented by the present techniques, that one may elect to tradeoff flow rates through a given apparatus (and thereby retention time in the field) against field intensities to an extent heretofore not deemed practical. Thus the magnetic field to which the slurry is subjected in the practice of the present invention, may be dropped to at least as low as 0.5 kG, and yet provide acceptable separation of the discolorant minerals.

In general retention times are adjusted to the field intensities utilized. For example, at a field intensity of 5 kilogauss, use of the invention with the aforementioned Marston-type of apparatus yields an acceptable mineral separation with retention times as low as 15 seconds. The present invention indeed makes possible "trade-offs" in retention time vis-a-vis field intensity to a degree heretofore unknown in the art. The aforementioned Marston-type of apparatus is designed for (and has in the past been operated) at about 15 to 22 kilogauss. With these last levels of field intensities typical retention times in the practice of the present invention are of the order of 15 to 80 seconds. Within the limits of the technology (and of economics), higher fields may also be used with the invention, e.g. up to 60 kilogauss, or higher.

The concept of an isoelectric point is one that is well known, especially in the art pertinent to colloids. Thus for typical materials, such as the inorganic oxides which are sought to be separated by the present techniques, it is known that particles thereof dispersed in a liquid phase have a net surface charge, which can be acquired by a number of different mechanisms, including adsorption of protons or hydroxyl ions from solution onto the particle surface, or by surface disassociation. In addition anions, cations or surfactants present may be adsorbed from the solution to result in a surface charge of the same sign as the adsorbed species.

The aforementioned surface charge is known to vary with the pH of the aqueous solution. Thus in the presence of acid conditions, protons are adsorbed at the surface to yield positive charge, and under alkaline conditions hydroxyl ions are adsorbed to yield a negative charge. That pH at which the net charge on the surface is zero in the absence of specific adsorbed ions is referred to as the isoelectric point. This point of zero surface charge is also frequently referred to as the zero point of charge (ZPC). In these terms one can generalize the phenomenon by indicating that above the ZPC the suspended particles have a negative surface charge; and below the ZPC they display a positive surface charge.

In accordance with the present invention it is hypothesized that the mechanism instrumental in achieving the new results is one wherein the net surface charge of the particles sought to be co-flocculated (i.e. the titania particles and the added ferrimagnetic particles) are each reduced to zero; or to levels and polarities such that the two surfaces have potentials close to one another; or preferably, at opposite polarities, to thereby provide actual coulombic attraction between the said surfaces. See in this connection deLatour and Kolm, "Magnetic Separation in Water Pollution Control—II", *IEEE Transactions on Magnetics,* Vol. Mag.—11 No. 5, September 1975.

In the foregoing sense the mechanism of the invention may perhaps be better appreciated by considering that in a colloidal state, at least, it is the "normal" presence of mutually repellant charge on the suspended particles which maintain the said colloidal state. From the mentioned colloidal state, coagulation or precipitation is often effected by adjusting the pH to a point where the maintaining charge between particles is dissipated.

By analogy in the present environment, one admixes the ferrimagnetic seeding particles and the clay slurry, and if necessary adjusts the pH to remove those conditions which "normally" prevent co-flocculation, or even augments the co-flocculating conditions by inducing respective charge of opposed polarities on the species to be co-flocculated.

The material of the preferred ferrimagnetic particulate seeding system used in the present invention, i.e. the ferrosoferric oxide particulate aforementioned, has an isoelectric point of approximately 6.5, which lies very close to that of the principal metallic mineral sought to be separated from the aqueous clay slurry, i.e. $TiO_2$ at an isoelectric point of 6.2. Further background and information pertinent to isoelectric points may be found in papers such as G. A. Parks "The Isoelectric Points of Solid Oxides, Solid Hydroxides, and Aqueous Hydroxo Complex Systems", *Chemical Reviewers,* 65, 177 (1965).

DESCRIPTION OF PREFERRED EMBODIMENT

Figure 1:
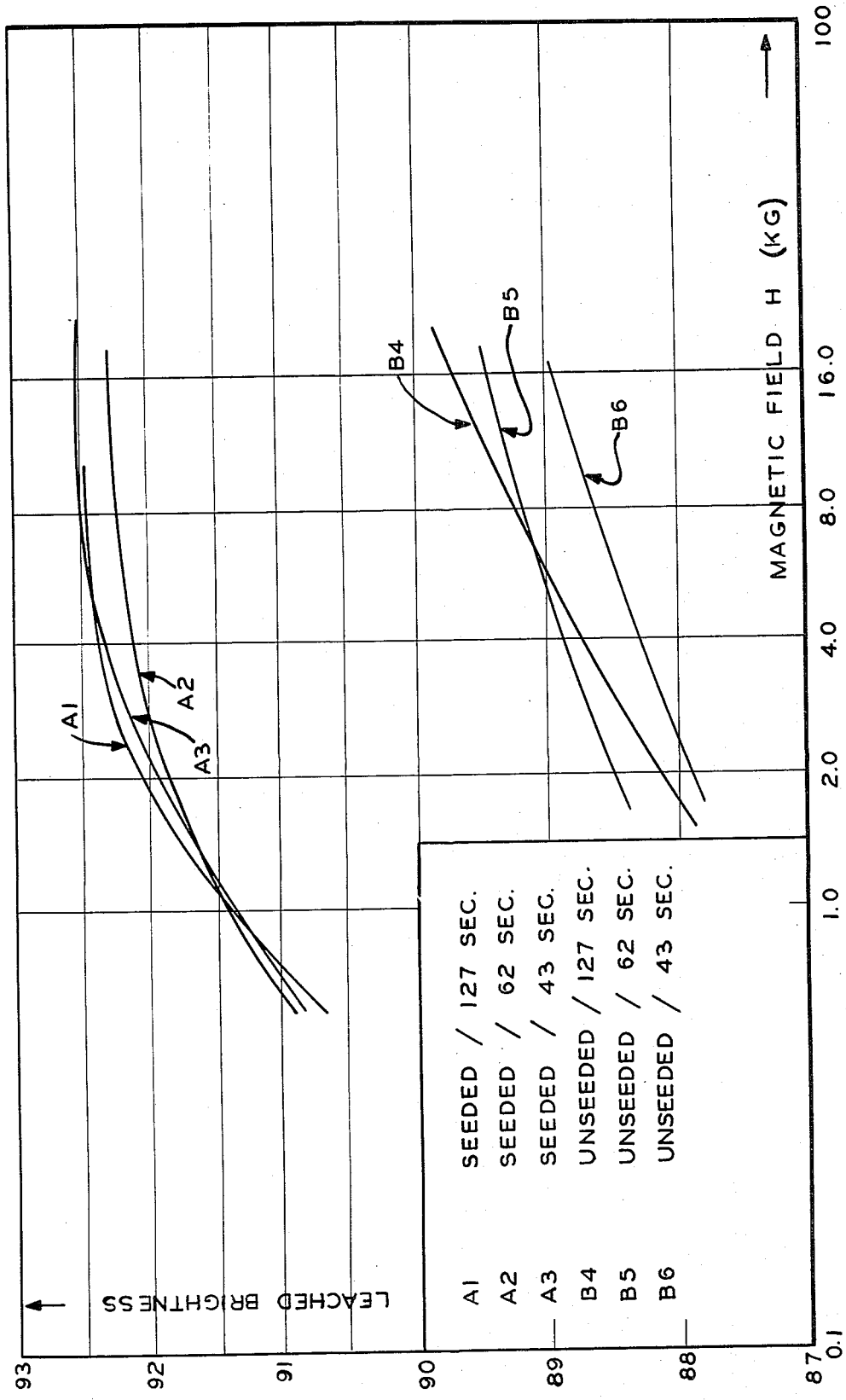
FIG. 1 is a graph depicting brightness characteristics as a function of applied magnetic field for a representative clay subjected to magnetic separation under various treatment conditions, including by application of the present invention.

The manner in which the present invention is practiced, is best understood by consideration of the Examples now to be set forth, which further will render clear to those familiar with the present art, the striking brightness improvements achieved by the practice of the present methodology.

A preferred magnetic seeding particulate for use in the processes of the present invention is a synthesized ferroso-ferric oxide which is prepared by coprecipitating iron (III) and iron (II) ions from an aqueous solution in a desired molar ratio, by neutralization with an excess of a relatively strong base, such as ammonium or sodium hydroxide. The particle sizes and size distribution of the resultant particulate varies somewhat according to the specifics of the reaction conditions; but in general the particulate has a size distribution such that at least 50% by weight of the particles have an equivalent diameter less than 1 micron—as determined by electron microscopy. Indeed the ultimate particle size of the ferroso-ferric oxide is of the order of 100 Å.

The cited reaction results in an intense black colored ferrimagnetic precipitate. The precipitate, as thus far described, is suspended in the aqueous carrier and thus defines an aqueous particulate. Since such particulate is unpeptized, it is physically unstable, i.e. the particles are transiently suspended and will gradually settle if permitted to stand. The molar proportions of the two iron species can be mixed to yield products of varying magnetic saturation values. In a preferrd compositional range the ferroso-ferric oxide thus prepared, will have an iron (III) to iron (II) ratio of from about 1 to 2.5; with yet more optimal range having a ratio of from about 1.5 to 2.0.

EXAMPLE I

A magnetic seeding particulate for use in the processes of the invention, was prepared by weighing 12.8 g of $FeCl_2.4H_2O$ and 18.6 g of $FeCl_3$ (anhydrous in a 400 ml flask). 200 ml of deionized water were added, with good stirring. With vigorous stirring 61.2 ml of $NH_4OH$ (28% solution) were thereupon added. This yielded approximately 254 ml of magnetic seeding particulate "solution". Dose rates in many of the following Examples are expressed in ml of such an aqueous magnetic particulate added to a clay slurry containing 4 lb. dry weight of clay. For example, a dose rate of 100 ml/4 lb. clay corresponds to 50 liters/ton or 13.2 U.S. gallons/ton. If it is assumed that all the iron in the salt solution is converted to $Fe_3O_4$, then 264 ml of the aqueous magnetic particulate will contain 13.2 g of $Fe_3O_4$. Therefore a dose rate of 100 ml/4 lb. clay will correspond to 5.0 g/4 lbs. clay, to 2.5 Kg $Fe_3O_4$ per ton of clay, or 4.5 lbs. $Fe_3O_4$ per ton of clay.

EXAMPLE II

In the Example hereinbelow set forth, the methodology of the present invention was practiced upon kaolin clay samples, and the results compared with those obtained by use of prior art methods.

The magnetic seeding particulate utilized was prepared as described in Example I, and was thus an aqueous, unpeptized dispersion which could be regarded as physically "unstable" in the sense that the particulate would tend to settle out from the aqueous carrier over an extended period.

The clay used was a relatively coarse, soft cream Georgia kaolin. The crude sample exhibited a G. E. brightness of 83.4—where such brightness is obtained according to the standard specification established by TAPPI procedure T-64m-54. The $TiO_2$ content of the crude sample was 1.68%, the $Fe_2O_3$ content was 0.18%, and the particle size distribution such that 45% by weight had an E.S.D. (equivalent spherical diameter) below 2 microns.

In all instances, approximately 5 lbs. of the crude clay (4 lbs. dry weight), was initially blunged at 60% solids with the required amount of dispersant. It may be noted in that connection that optimization of the present process when used with given clays, has been found to be partially a function of the dispersant and its concentration.

The clay samples following blunging were conditioned for 15 minutes using high speed mixing. The approximate work input during this step was about 50 hp-hr/ton of dry clay—with 30 to 60 hp-hr/ton being a preferred range of operation. At this point the seeding particulate was added to certain of the samples at a concentration level of 50 ml/4# dry clay—which was found to be relatively optimum—and mixing was then continued for approximately 1 minute. It may be noted in this connection that it has been found that the seeding particulate is indeed preferably added subsequent to most of the conditioning work, i.e. subsequent to the dissipation of approximately 30 to 60 hp-hrs/ton solids of work. The further conditioning in the presence of the seeding particulate, preferably is conducted for approximately 30 to 90 seconds.

Following dispersion of the seeding particulate, the seeded slurry samples were diluted to a level of 20% solids, and this slurry passed through magnetic separating apparatus of the Marston or similar type—i.e. preferably through a porous ferromagnetic matrix maintained in an applied magnetic field. The pH of the slurries prior to treatment in the magnetic separator was in the range of 9.0 to 9.2. The matrix used comprised a stainless steel wool at a 7% packing (sometimes indicated hereinbelow as "7% v/v".) By this is meant that 7% of the separator canister volume was effectively occupied by the matrix material.

A given volume of the "magnetted" slurry was in all instances caught for further analysis. This was flocced with $H_2SO_4$, filtered and dried. Product brightness, $TiO_2$ and $Fe_2O_3$ content were measured. A sample of the slurry was also cut using a centrifuge, to provide a 90% less than 2 micron E.S.D. fraction. This fraction was flocculated with $H_2SO_4$ to a pH of 3.5, and leached with sodium hydrosulfite at a level of 8 lbs/ton. The sample was dried and leached brightness measured.

The samples considered in this Example which were not seeded (and therefore served as controls), were blunged and conditioned as discussed for the seeded samples. After conditioning these unseeded samples were diluted to 20% solids and subjected to magnetic separation using the same apparatus as described above. The samples were then processed and tested for brightness by the same procedure as used for the seeded samples.

The major variables considered were variation in the intensity of the applied magnetic field—typical variations ran from 0.64 kG to 18.2 kG; and variation in retention time in the field.

In Table I hereinbelow, data is set forth with respect to the aforementioned clay samples, which have been processed in accordance with the procedures just described. More specifically, results are tabularized for such samples which are processed in the magnetic separator at 20% w/w solids, and for three different retention times. The samples are further processed both with and without use of the magnetic seeding particulate of the invention, and under various magnetic field intensity conditions. In all instances the results refer to processing of 3200 ml quantities of slurry—corresponding to approximately 4.4 canister volumes. The canister utilized in obtaining the data in Table I had an effective volume of 725 cm$^3$, whereby the 3200 ml volume corresponded to a collection of approximately 4.4 canister volumes.

TABLE I

| Retention Time | Field (KG) | WITH MAGNETIC SEEDING PARTICULATE | | | | WITHOUT MAGNETIC SEEDING PARTICULATE | | | |
|---|---|---|---|---|---|---|---|---|---|
| | | Brightness | | TiO$_2$ % | Fe$_2$O$_3$ % | Brightness | | TiO$_2$ % | Fe$_2$O$_3$ % |
| | | Product | Leached | | | Product | Leached | | |
| | 0.64 | 87.2 | 90.8 | 0.29 | 0.16 | — | — | — | — |
| | 1.6 | 89.0 | 91.5 | 0.27 | 0.16 | 84.5 | 88.0 | 1.20 | 0.16 |
| | 2.3 | 89.3 | 92.3 | 0.09 | 0.16 | — | — | — | — |
| 127 sec. | 3.9 | 89.6 | 92.4 | 0.07 | 0.16 | 85.7 | 88.5 | 1.12 | 0.17 |

TABLE I-continued

| Retention Time | Field (KG) | WITH MAGNETIC SEEDING PARTICULATE | | | | WITHOUT MAGNETIC SEEDING PARTICULATE | | | |
|---|---|---|---|---|---|---|---|---|---|
| | | Brightness | | $TiO_2$ % | $Fe_2O_3$ % | Brightness | | $TiO_2$ % | $Fe_2O_3$ % |
| | | Product | Leached | | | Product | Leached | | |
| | 6.1 | 90.0 | 92.4 | 0.06 | 0.16 | — | — | — | — |
| | 8.3 | 90.0 | 92.4 | 0.06 | 0.16 | 86.5 | 89.3 | 1.06 | 0.18 |
| | 12.2 | 90.0 | 92.5 | 0.05 | 0.16 | — | — | — | — |
| | 18.1 | 90.0 | 92.5 | 0.05 | 0.16 | 87.2 | 89.8 | 0.98 | 0.18 |
| | 0.64 | 86.8 | 91.0 | 0.30 | 0.14 | — | — | 0.98 | 0.18 |
| | 1.6 | 88.7 | 91.9 | 0.20 | 0.18 | 85.0 | 88.5 | 1.29 | 0.18 |
| | 2.3 | 89.4 | 92.0 | 0.13 | 0.14 | — | — | — | — |
| 62 sec. | 3.9 | 89.6 | 92.0 | 0.09 | 0.14 | 85.7 | 88.8 | 1.15 | 0.19 |
| | 6.1 | 89.8 | 92.0 | 0.08 | 0.18 | — | — | — | — |
| | 8.3 | 89.8 | 92.2 | 0.07 | 0.17 | 86.5 | 89.0 | 1.10 | 0.17 |
| | 12.2 | 89.8 | 92.2 | 0.06 | 0.19 | — | — | — | — |
| | 18.1 | 89.8 | 92.2 | 0.06 | 0.14 | 87.0 | 89.5 | 1.02 | 0.17 |
| | 0.64 | 86.9 | 91.0 | 0.40 | 0.16 | — | — | — | — |
| | 1.6 | 88.3 | 91.8 | 0.35 | 0.17 | 84.3 | 88.0 | 1.38 | 0.18 |
| | 2.3 | 88.3 | 92.1 | 0.28 | 0.18 | — | — | — | — |
| 43 sec. | 3.9 | 88.5 | 92.2 | 0.24 | 0.16 | 85.0 | 88.3 | 1.29 | 0.18 |
| | 6.1 | 89.3 | 92.5 | 0.14 | 0.16 | — | — | — | — |
| | 8.3 | 89.1 | 92.5 | 0.14 | 0.16 | 85.8 | 88.6 | 1.15 | 0.18 |
| | 12.2 | 89.2 | 92.5 | 0.14 | 0.16 | — | — | — | — |
| | 18.1 | 89.3 | 92.5 | 0.14 | 0.16 | 86.5 | 89.0 | 1.10 | 0.18 |

In FIG. 1 the tabularized data is plotted for the clay samples which were processed with and without use of the magnetic seeding particulate of the invention. The conditions represented by the six curves set forth are indicated in the legends on the Figure. Specifically curves A-1, A-2 and A-3 illustrate leached brightnesses obtained using seeded magnetic separation for three different retention times; and the curves B-4, B-5 and B-6 illustrate leached brightness results obtained with prior art magnetic separation, for the same three different retention times.

In general, it will be noted, that in the absence of seeding the best brightness achieved was approximately 89.8 under conditions of applied field of 18.1 kG, and retention time of 127 seconds. The brightness results obtained with seeding, as illustrated in FIG. 1, are clearly vastly superior. For example, it will be evident that a 91 brightness is yielded at fields as low as 0.6 kG. Similarly, it will be clear that 92 brightnesses were obtainable at applied fields of less than 2.5 kG with retention times as low as 62 seconds.

EXAMPLE III

Further clay samples of the type heretofore mentioned, were processed utilizing the method of the present invention, under the following experimental conditions:

TABLE II

| Magnetic Field | 8 kilogauss |
|---|---|
| Residence Time | 120 seconds |
| Seed Dose Rate | 10 ml/lb. dry clay |
| Canister Volume | 725 cm³ |
| Matrix Packing | 7% v/v |

The co-flocculated titanium dioxide discolorant and seeding particulate retained at the separator matrix was flushed from the matrix with water with the magnetic field extinguished. This "concentrate" was then examined under a transmission electron microscope at various magnifications.

Figure 2:
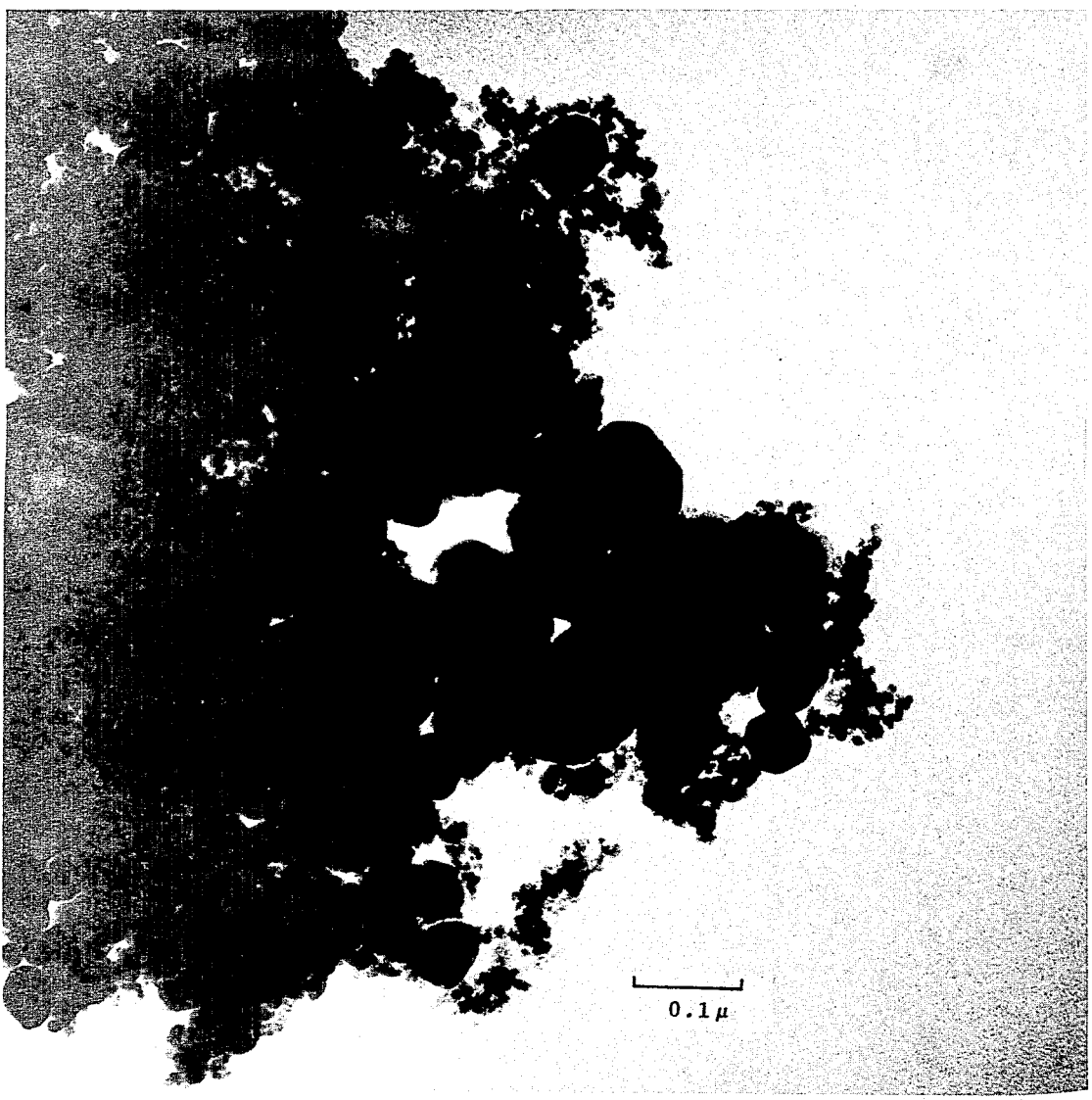
FIGS. 2 and 3 are each electron photomicrographs of a co-flocculated titanium dioxide contaminant and ferrimagnetic seeding particulate separated from a seeded slurry of a crude kaolin, pursuant to the present invention.

In the resultant electron photomicrograph of FIG. 2, the magnification is 192,000X. The $TiO_2$ particles appear as intensely black, somewhat egg-shaped forms, which in the scale of the photograph have diameters of the order of at least 1 cm or larger. The seeding particles appear as agglomerations of tiny black dots, which in the scale of the photograph are approximately 1 mm or less; the agglomerates of these very small particles appear in the photograph to resemble "frog spawn" or similar groupings of fish eggs. It may be observed from the actual scale provided as part of these photographs, that the ultimate actual dimensions of these seeding particles are indeed (as already mentioned) of the order of 100 A or so. It can clearly be seen from the photograph of FIG. 2 that the magnetic seeding particles are directly associated with the titania particles.

Figure 3:
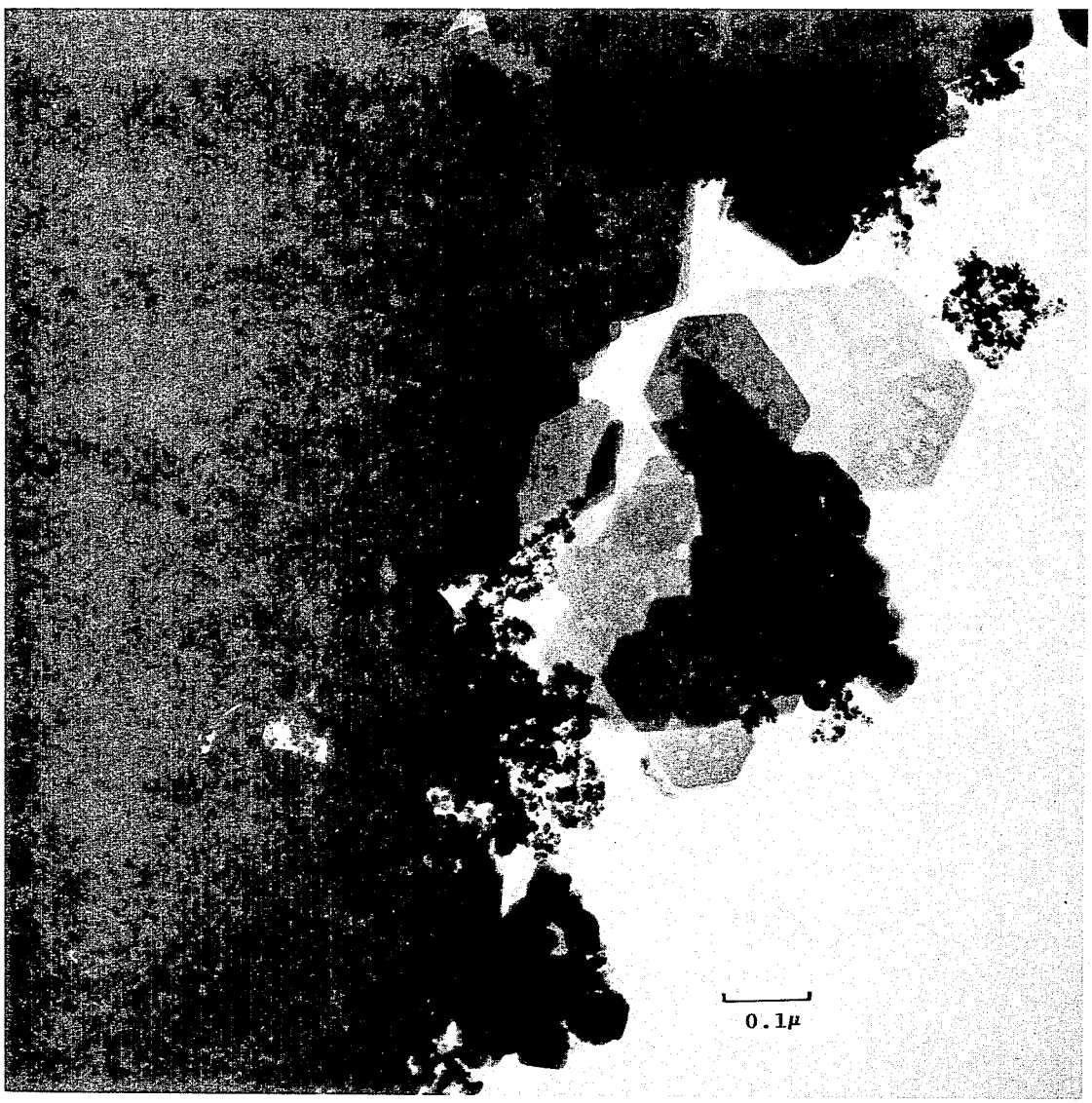

The electron photomicrograph appearing as FIG. 3, was made at a magnification of 154,000X. In this photograph, the clay particles are also clearly seen, which particles appear as light, rather extended hexagonal forms. Those clay particles at the left portion of the photograph, e.g. have dimensions (on the scale of the photograph) of approximately 4 cm. This FIG. 3 photograph illustrates the remarkable degree to which the seeding particles have become preferentially associated with, i.e. co-flocculated with, the titania particles—to the exclusion of association with the clay particles.

EXAMPLE IV

In this Example aqueous particulates of additional ferrimagnetic materials were utilized as seeding particulates in the present invention. In particular nickel and cobalt ferrites were prepared using the procedure described as one aspect of a communication entitled "Preparation, Growth, & Study of Ultrafine Ferrite Particles" (Schuelle, W. J. and Deetscreek, V. D., J. Appl. Phys. 32 Suppl, No. 3, 235S, [1961]). This is similar to the method described in Example I for producing ferroso-ferric oxide. Nickel (or cobalt) chloride was thus mixed with the ferric chloride in the molar ratio of 1:1.8 (as for ferroso-ferric oxide) and $NH_4OH$ added to the mixture rapidly. In this Example the resultant aqueous precipitate was utilized without stablizing same by peptization or the like.

The magnetic seeding particulates thus prepared were then utilized for seeding kaolin clay slurry samples of the same clay type as used in Example II. The seeded slurries were thereupon passed through magnetic separating apparatus of the type discussed in connection with Example II. A matrix of 7.5% v/v packed steel wool was employed. The retention time was 72 seconds; and a field intensity of 15 kilogauss was utilized. The dosage rate of the seeding particulate was varied. Brightness data obtained in consequence is set forth in Table III below:

TABLE III

| Magnetic Seeding Particulate | Concentration (ml/4 lb. clay) | Brightness Product | Brightness Leached | $TiO_2$ (%) | $Fe_2O_3$ (%) |
|---|---|---|---|---|---|
| $NiFe_2O_4$ | 25 | 86.8 | 89.6 | 0.93 | 0.13 |
| $NiFe_2O_4$ | 40 | 88.4 | 90.7 | 0.81 | 0.11 |
| $CoFe_2O_4$ | 25 | 87.5 | 90.0 | 0.78 | 0.16 |
| $CoFe_2O_4$ | 40 | 88.2 | 90.6 | 0.81 | 0.16 |

As may be ascertained from the control data of Table I, these results are in all instances, superior to prior art magnetic separation, conducted under similar conditions—but without use of the seeding methods of the present invention. It should also be understood that other magnetic ferrites can be prepared by the procedures of this Example, and utilized in the invention.

EXAMPLE V

An aqueous slurry of a kaolin clay of the same type described in Example II was seeded with a further magnetic ferrite, i.e. $BaFe_2O_4$. The barium ferrite utilized was obtained from Alfa Chemicals—a division of Ventron Corp. of Beverly, Mass. It was added to the clay slurry as a dry powder and was mixed for approximately one minute. The seeded slurries were thereupon passed through a magnetic separating apparatus of the type discussed in connection with Example II. A matrix of 7.5% v/v was employed, with a retention time of 72 seconds in a field of 15 kilogauss intensity. The doseage rate of the seeding particulate was varied. Brightness data obtained in consequence is set forth in Table IV below.

TABLE IV

| Magnetic Seeding Particulate | Concentration lb/Ton dry clay | Brightness Product | Brightness Leached | $TiO_2$ (%) |
|---|---|---|---|---|
| $BaFe_2O_4$ | 2.5 | 87.8 | 89.8 | 0.97 |
| $BaFe_2O_4$ | 5 | 88.2 | 90.5 | 0.78 |

As may be ascertained from the control data of Table I, these results are, again, superior to prior art magnetic separation, conducted under similar conditions—but without use of the seeding methods of the present invention.

EXAMPLE VI

In this Example, clay slurry samples were prepared utilizing a further soft Georgia cream kaolin clay. The particle size distribution of this clay was such that approximately 70% by weight had an E.S.D. less than 2 microns. The crude brightness of the clay was approximately 83.1, and $TiO_2$ content about 1.46%. The slurry samples were processed using the procedures and conditions of Example V, i.e. the seeding material used was dry barium ferrite powder. Control experiments were also conducted—i.e. without seeding.

Brightness data obtained in consequence is set forth in Table V below:

TABLE V

| Magnetic Seeding Particulate | Seed Dose (lb/Ton dry clay) | Brightness Product | Brightness Leached | $TiO_2$ (%) |
|---|---|---|---|---|
| unseeded | — | 87.5 | 89.6 | 1.02 |
| $BaFe_2O_4$ | 2.5 | 90.0 | 91.2 | 0.27 |
| $BaFe_2O_4$ | 5.0 | 90.4 | 91.8 | 0.18 |

EXAMPLE VII

In this example three different methods were utilized in synthesizing ferroso-ferric oxide particulates for use in the invention: (a) The procedure of Example I was followed; (b) The composition obtained by method (a) was filtered, and then washed with copious quantities of deionized water. Finally it was washed and peptized with 0.01 normal HCl. The dry sediment was dispersed in boiling water; (c) The sediment of ferroso-ferric oxide obtained by using method (b) was dispersed in a boiling solution of 0.5% soap using the procedure described in the aforementioned Elmore reference.

The magnetic seeding materials prepared by methods (a), (b) and (c) were thereupon utilized in the course of treating kaolin clay samples. In each instance the doseage rate was equalized, so that each 4# clay sample contained 3.72 g of ferroso-ferric oxide, i.e. the equivalent of 75 ml of the aqueous compositions of Example I. The separating apparatus was of the same type utilized in previous Examples, with a field of 15 kilogauss being employed; a matrix of 7.5% v/v steel wool, and a retention time of 72 seconds. The resultant data is set forth in Table VI for the two clay types described in Example V ("coarse" clay) and Example VI ("fine" clay).

TABLE VI

| Clay | Preparation Method | Product Brightness | Leached Brightness | $TiO_2$ (%) |
|---|---|---|---|---|
| "coarse" clay | (a) | 84.0 | 90.2 | 0.43 |
| | (b) | 88.2 | 90.0 | 0.88 |
| | (c) | 88.2 | 89.5 | 0.87 |
| "fine" clay | (a) | 87.5 | 91.2 | 0.87 |
| | (b) | 89.5 | 91.0 | 0.87 |
| | (c) | 89.6 | 90.7 | 0.94 |

Consideration of Table VI indicates that, in general, each of the methods (a) through (c) yield effective results with the invention.

The foregoing Examples, including the photomicrographs of FIGS. 2 and 3, clearly demonstrate a completely unexpected aspect of our invention, namely our discovery that the magnetic seed has unexpectedly attached itself to the titanium dioxide particles in preference to the kaolin particles. It should be noted in this context that kaolin is more easily wet by water than are titanium dioxide particles, and therefore according to previously expounded theories, the magnetic seed would have been predicted to attach to the kaolin particles if such seed were in a water carrier.

While the present invention has been particularly set forth in terms of specific embodiments thereof, it will be understood in view of the instant disclosure, that numerous variations upon the invention yet reside within the scope of the present teaching. Accordingly the invention is to be broadly construed, and limited only by the scope and spirit of the claims now apended hereto.

We claim:

1. A method for magnetically separating titaniferous discolorants from a crude kaolin clay, comprising the steps of:

forming a dispersed aqueous slurry of said clay;

spontaneously coflocculating ferrimagnetic particles with said titaniferous impurities by seeding said slurry with a system of said particles, wherein said particles are predominantly sub-micron in size and comprise a magnetic ferrite of the general formula $MO \cdot Fe_2O_3$, where M is a divalent metal ion; and passing the resultant slurry through a porous ferromagnetic matrix in the presence of a magnetic field, to separate said coflocculated particles and impurities at said matrix.

2. A method in accordance with claim 1, wherein the particles of said system are suspended in an aqueous carrier phase.

3. A system in accordance with claim 2, wherein said particles are transiently suspended in said aqueous phase.

4. A method in accordance with claim 1, wherein said system is added to said slurry as a dry powder.

5. A method in accordance with claim 4, wherein said system is substantially free of oils.

6. A method in accordance with claim 1, wherein said ferrite comprises ferroso-ferric oxide.

7. A method in accordance with claim 1, wherein said ferrite comprises $NiFe_2O_4$.

8. A method in accordance with claim 1, wherein said ferrite comprises $CoFe_2O_4$.

9. A method in accordance with claim 1, wherein said ferrite comprises $BaFe_2O_4$.

10. A method in accordance with claim 1, wherein said system comprises the product of aqueous coprecipitation of an iron (III) salt with the salt of the said divalent metal in the presence of an excess of a strong base.

11. A method in accordance with claim 10, wherein said system comprises the product of aqueous coprecipitation of iron (III) with nickel (II) salts.

12. A method in accordance with claim 10, wherein said system comprises the product of aqueous coprecipitation of iron (III) with cobalt (II) salts.

13. A method in accordance with claim 1, wherein said magnetic field has an intensity in the range of from about 0.5 to 22 kilogauss.

14. A method in accordance with claim 1, wherein said magnetic field has an intensity in the range of from about 0.5 to 5 kilogauss.

15. A method in accordance with claim 1, wherein said matrix comprises a steel wool.

* * * * *